US005231907A

United States Patent [19]

Matsuoka

[11] Patent Number: 5,231,907

[45] Date of Patent: Aug. 3, 1993

[54] NOISE REDUCING STRUCTURE OF SLIDE-CAM DIE

[75] Inventor: Mitsuo Matsuoka, Hirakata, Japan

[73] Assignee: Umix Co., Ltd., Neyagawa, Japan

[21] Appl. No.: 910,444

[22] Filed: Jul. 8, 1992

[51] Int. Cl.[5] .......... B26D 5/16; B32J 9/18

[52] U.S. Cl. .......... 83/588; 83/635; 72/452; 72/313; 72/315

[58] Field of Search .......... 72/313, 314, 315, 304, 72/381, 383, 452; 83/588, 627, 635

[56] References Cited

U.S. PATENT DOCUMENTS

| | | | |
|---|---|---|---|
| 2,421,864 | 6/1947 | Becker | 83/627 |
| 3,541,909 | 11/1970 | Franzen | 83/635 |
| 4,487,051 | 12/1984 | Inamoto | 72/312 |
| 5,101,705 | 4/1992 | Matsuoka | 83/588 |

FOREIGN PATENT DOCUMENTS

| | | | |
|---|---|---|---|
| 202924 | 11/1983 | Japan | 72/452 |
| 087933 | 5/1984 | Japan | 72/315 |
| 193723 | 11/1984 | Japan | 72/452 |
| 137530 | 7/1985 | Japan | 72/315 |
| 263824 | 11/1987 | Japan | 72/313 |

OTHER PUBLICATIONS

Degele Manufacturing, Inc. Catalogue entitled "DMI Cam Units", printed Jun. 14, 1991.

Degele Manufacturing, Inc. Catalogue entitled "DMI Cam Units", printed Feb. 21, 1992.

Sankyo, Catalogue entitled "Cam Unit, Flying".

Sankyo, Catalogue entitled "Cam Unit, Inclined".

*Primary Examiner*—David Jones

[57] ABSTRACT

A noise reducing die assembly comprising, a passive cam having an inclined passive face of a fixed inclination angle $\alpha$, and an actuating cam having an inclined actuating face of the same inclination angle $\alpha$ as that of the inclined passive face of the passive cam, and contacting the inclined actuating face of the actuating cam to the inclined passive face of the passive cam to drive the passive cam for pressing a work; a roller is disposed rotatably at the side of the passive cam, and a speed control cam plate having, at a location of the actuating cam facing the roller, a cam face having, at a position where an upper die contacts to the roller at the beginning of descending, a low-speed inclination angle $\beta$ which is larger than the inclination angle $\alpha$ of the inclined faces of the passive cam and the actuating cam and close to a right angle, and a succeeding medium-speed inclination angle $\gamma$ which is slightly larger than the inclination angle $\alpha$ of the inclined faces of the passive cam and the actuating cam, is disposed such that, after the medium-speed inclination angle $\gamma$ of the cam plate has contacted to the roller, the inclined actuating face of the actuating cam contacts to the inclined passive face of the passive cam for pressing work.

4 Claims, 7 Drawing Sheets

NOISE REDUCING STRUCTURE OF SLIDE-CAM DIE

BACKGROUND OF THE INVENTION

The present invention relates to a noise reducing structure of slide-cam die.

A general structure of conventional slide-cam die is as shown in FIG. 7.

That is, to a base plate 116 of a lower die 101, a work positioning member 103 for positioning a work 102 is secured, and for piercing a side wall 102*a* of the work 102, a passive cam 104 which slides in the direction approaching to and parting from the side wall 102*a* is disposed. A piercing punch 105 is horizontally secured to a portion of the passive cam 104 facing the side wall 102*a* of the work 102. Numeral 106 designates a stripper plate, numeral 107 designates a cushion rubber and numeral 108 designates a die bush.

To the rear side of the passive cam 104, a heel 109 is secured and through which a rod 110 whose end is screwed into the rear surface of the passive cam 104 inserted, thereby the passive cam 104 is urged in a direction parting from the side wall 102*a* of the work 102 by a coil spring 111.

Meanwhile, to a base plate 122 of an upper die 121, an actuating cam 123 is secured at a position facing the passive cam 104 of the lower die 101.

Numeral 124 designates a stripper plate, and numeral 125 designates a cushion rubber.

When piercing the side wall 102*a* of the work 102 by the slide-cam die, the upper die 121 descends from a top dead point, and while the upper face of the work 102 is pressed by the stripper plate 124 and the actuating cam 123 is backed up by the heel 109, an inclined actuating face 123*a* of the actuating cam 123 is contacted to an inclined passive face 104*a* of the passive cam 104 to bring the punch 105 close to the side wall 102*a* of the work 102 for piercing. The completion time of piercing is a state of bottom dead point shown in the figure.

When the upper die 121 ascends after the completion of piercing, the passive cam 104 slides in a direction parting from the side wall 102*a* of the work 102 by an urging force of the coil spring 111.

Recently, noise generated at pressing has caused social problems. Noise is generated when punching metal sheets or at pressing by the cam type die, wherein the inclined actuating face of the actuating cam hits and drives the inclined passive face of the passive cam. Particularly, the cam type die is very noisy and it is said that 40% of the whole press shop noise is occupied by noise of the cam type die.

In the above-mentioned conventional example, an inclination angle $\theta$ of the inclined passive face 104*a* of the passive cam 104 and an inclination angle 8 of the inclined actuating face 123*a* of the actuating cam 123 are formed into a same angle, and a large inclined actuating face 123*a* area of the actuating cam 123 and a large inclined passive face 104*a* area of the passive cam 104 are totally contacted with each other instantaneously to generate large noise. Since the quiescent passive cam 104 is suddenly moved forcibly, the punch 105 and the stripper plate 106 installed on the passive cam 104 and the cushion rubber 107 starts to vibrate to cause noises.

In view of the above-mentioned circumstances, the present invention provides a noise-reducing structure of slide-cam die, wherein in the slide-cam die comprising, for reducing noise in the slide-cam die as much as possible, a passive cam having an inclined passive face of a fixed inclination angle $\alpha$, and an actuating cam having an inclined actuating face of the same inclination angle $\alpha$ as that of the inclined passive face of the passive cam, and contacting the inclined actuating face of the actuating cam to the inclined passive face of the passive-cam to drive the actuating cam for pressing a work; a roller is disposed rotatably at the side of the passive cam, and a speed control cam plate having, at a location of the actuating cam facing the roller, a cam face having, at a position where an upper die contacts to the roller at the beginning of descending, a low-speed inclination angle $\beta$ which is larger than the inclination angle $\alpha$ of the inclined faces of the passive cam and the actuating cam and close to a right angle, and a succeeding medium-speed inclination angle $\gamma$ which is slightly larger than the inclination angle $\alpha$ of the inclined faces of the passive cam and the actuating cam is disposed such that, after the medium-speed inclination angle $\gamma$ of the cam plate has contacted to the roller, the inclined actuating face of the actuating cam and the inclined passive face of the passive cam are brought in contact with each other to shift the passive cam to the low, medium and pressing speeds continuously for pressing.

The present invention is that, since the roller is disposed rotatably at the side of the passive cam, and a speed control cam plate having, at a location of the actuating cam facing the roller, a cam face having, at a position where an upper die contacts to the roller at the beginning of descending, a low-speed inclination angle $\beta$ which is larger than the inclination angle $\alpha$ of the inclined faces of the passive cam and the actuating cam and close to a right angle, and a succeeding medium-speed inclination angle $\gamma$ which is slightly larger than the inclination angle $\alpha$ of the inclined faces of the passive cam and the actuating cam is disposed such that, after the medium-speed inclination angle $\gamma$ of the cam plate has contacted to the roller, the inclined actuating face of the actuating cam contacts to the inclined passive face of the passive cam for pressing work, noise is reduced remarkably.

DETAILED DESCRIPTION OF THE PREFERRED EMBODIMENTS

The present invention is particularly described in the following based upon a specific embodiment shown in FIG. 1 through FIG. 6 of the accompanying drawings.

Figure 1:
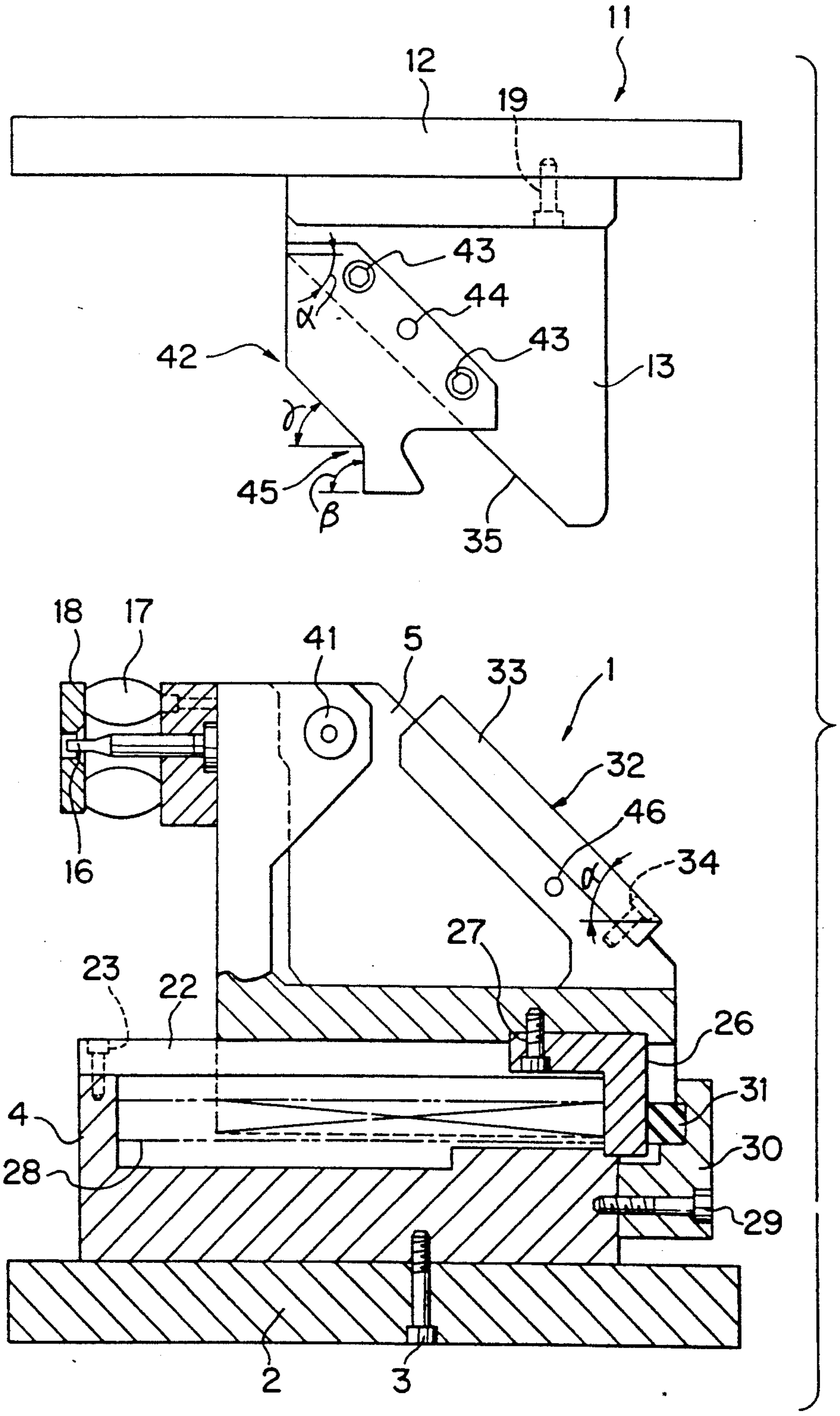
FIG. 1 is a side view of slide-cam die of one specific embodiment of the present invention which are at a top dead point.
Figure 2:
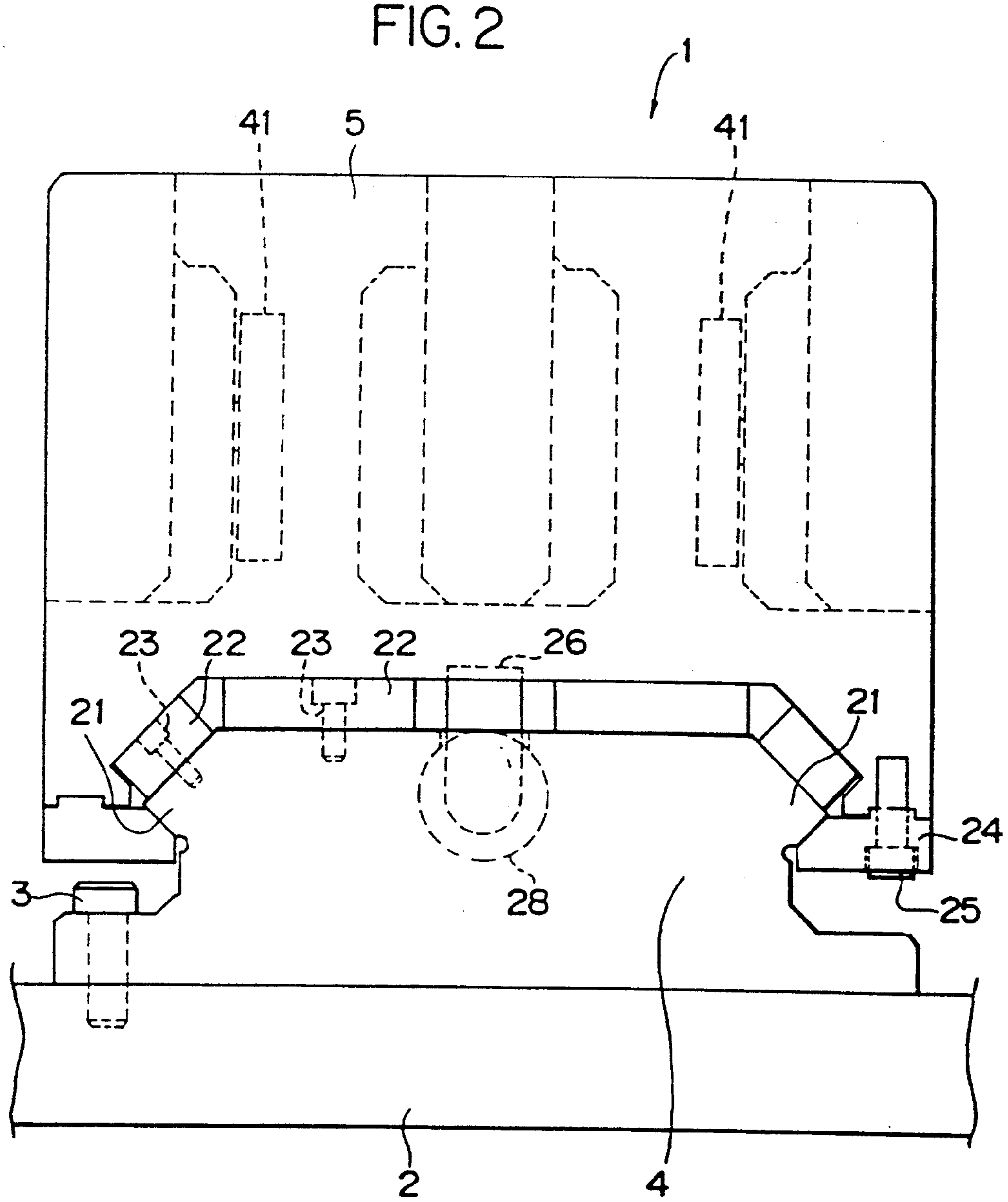
FIG. 2 is a front view of a lower die of FIG. 1.

FIG. 1 is a side view showing a state of top dead point of slide-cam die. FIG. 2 is a front view of a lower die.

A guide stand 4 is secured to an upper face of a base plate 2 of the lower die 1 by means of bolts 3, and a passive cam 5 is disposed slidably and horizontally on the guide stand 4.

Meanwhile, an actuating cam 13 is secured to a lower face of an upper die 11 by means of bolts 19 so as to face the passive cam 5 of the lower die 1.

Figure 7:
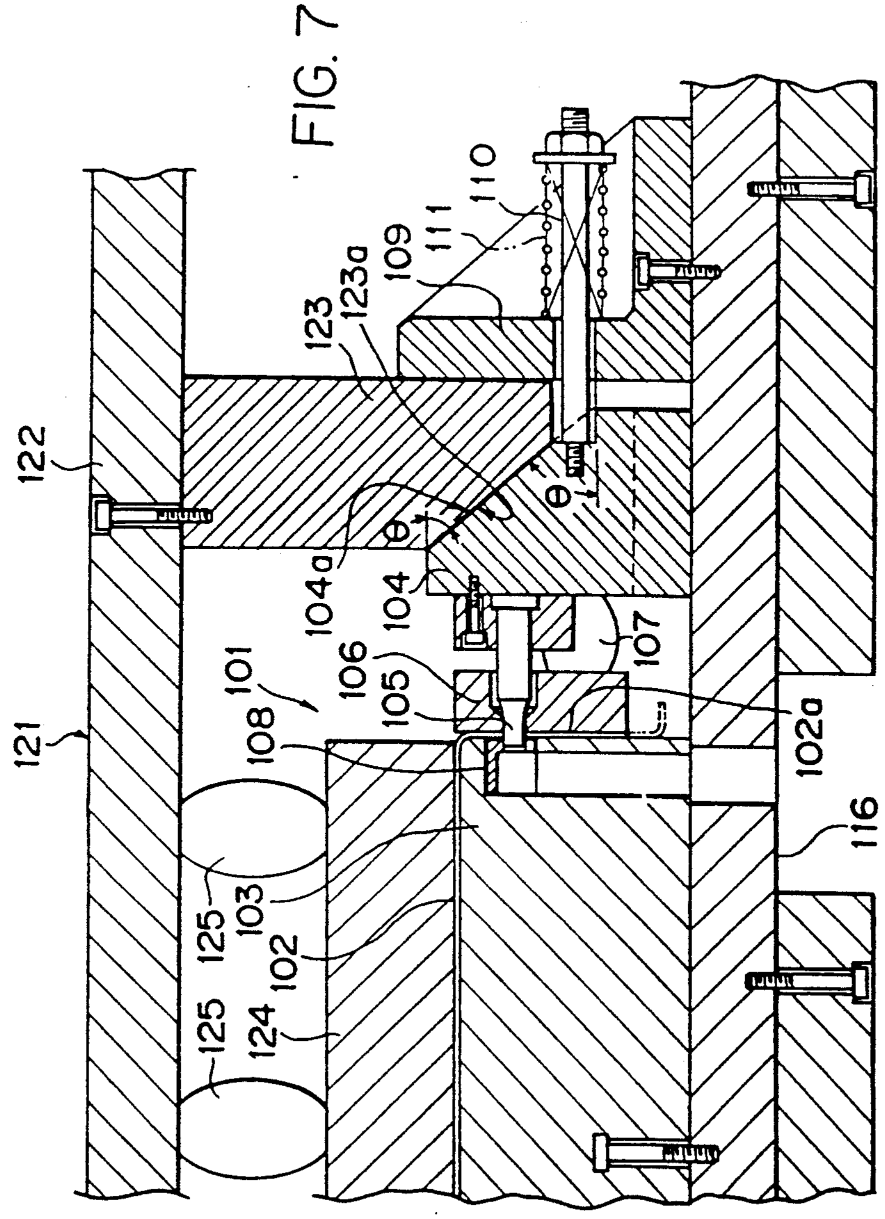
FIG. 7 is a longitudinal sectional view of conventional slide-cam die.

To a front face of the passive cam 5, a piercing punch 16 is secured horizontally, and at an end point of the punch 16 a stripper plate 18 is disposed via a cushion rubber 17. Though not shown, in front of the punch 16, as described in the conventional example of FIG. 7, a work is placed on a positioning member, and at a piercing position of the positioning member a die bush is buried. Hereinafter, for simplification of the description working members such as the punch 16 are not shown.

It goes without saying that the working members responsive to workings such as notching, forming and the like other than piercing, are disposed on the front face of the passive cam 5.

Though the passive cam 5 slides on the guide stand 4, guide projections 21 are projected symmetrically from the guide stand 4, and a wear plate 22 is secured to its upper face by means of bolts 23. Support plates 24 are secured to both sides of the passive cam 5 by means of bolts 25 so as to embrace the guide projections 21.

A spring shoe 26 is secured to a lower rear face of the passive cam 5, and one end of a coil spring 28 provided at the center portion of the guide stand 4 is contacted to the spring shoe 26 to urge the passive cam 5 backward.

A rear face of the spring shoe 26 urged by the coil spring 28 is secured to the rear face of the guide stand 4 by means of bolts 29, and is contacted to a cushion rubber 31 held by a hold plate 30.

On an upper rear face of the passive cam 5, an inclined passive face 32 having a fixed inclination angle $\alpha$ is formed by securing a wear plate 33 by means of bolts 34. The inclination angle $\alpha$ is usually set to 45°.

Meanwhile, also on the actuating cam 13 of the upper die 11, an inclined actuating face 35 which contacts to the inclined passive face 32 of the passive cam 5 and has the same inclination angle $\alpha$ is formed.

The slide-cam die of the present invention is a noise-reducing structure. For this end, it is necessary to avoid instantaneous contact between the inclined passive face 32 of the passive cam 5 and the inclined actuating face 35 of the actuating cam 13, and the passive cam 5 should move slowly at the beginning then move at a suitable working speed and slowly at the end, besides the moving speed of the passive cam should change gradually.

A roller 41 is disposed rotatably at the upper side of the passive cam 5 and a speed control cam plate 42 is secured to the actuating cam 13 of the upper die 11 facing the roller 41 by means of bolts 43, knock pins 44 is driven in after adjusting the position accurately.

The speed control cam plate 42 includes a cam face 45 consisting of a low-speed inclination angle $\beta$, which is larger than the inclination angle $\alpha$ of the inclined faces 32, 35 of the passive cam 5 and the actuating cam 11 and close to a right angle, and is formed at the lower side or a position which contacts to the roller 41 at the beginning, and a medium-speed inclination angle $\gamma$, which is slightly larger than the inclination angle $\alpha$ of the inclined faces 32, 35 of the passive cam 5 and the actuating cam 11 and is formed successively at the upper side thereof. Connection between the low-speed inclination angle $\alpha$ and the medium-speed inclination angle $\gamma$ takes the form of arc and is connected smoothly. The low-speed inclination angle $\beta$ is 85° and the medium-speed inclination angle $\gamma$ is 47°.

When the inclination angle is large, the passive cam 5 moves only a little horizontally at descending of the actuating cam 13, and when the inclination angle is small, the passive cam 5 moves largely horizontally at a slight downward movement of the actuating cam 13.

Though a safety pin 46 is projected horizontally at the rear side of the passive cam 5, this is described later.

The operation of the slide-cam die comprising speed control cam plate 42 is described.

FIG. 1 shows a state of top dead point. The speed control cam plate 42 disposed on the actuating cam 13 of the upper die 11 is arranged such that, its cam face 45 faces the roller 41 disposed on the passive cam 5 of the lower die 1. The spring shoe 26 on the lower rear face of the actuating cam 5 is urged by the coil spring 28 at its rear face and contacted to the cushion rubber 31. When a press machine is driven, the upper die 11 starts to descend from this state.

Figure 3:
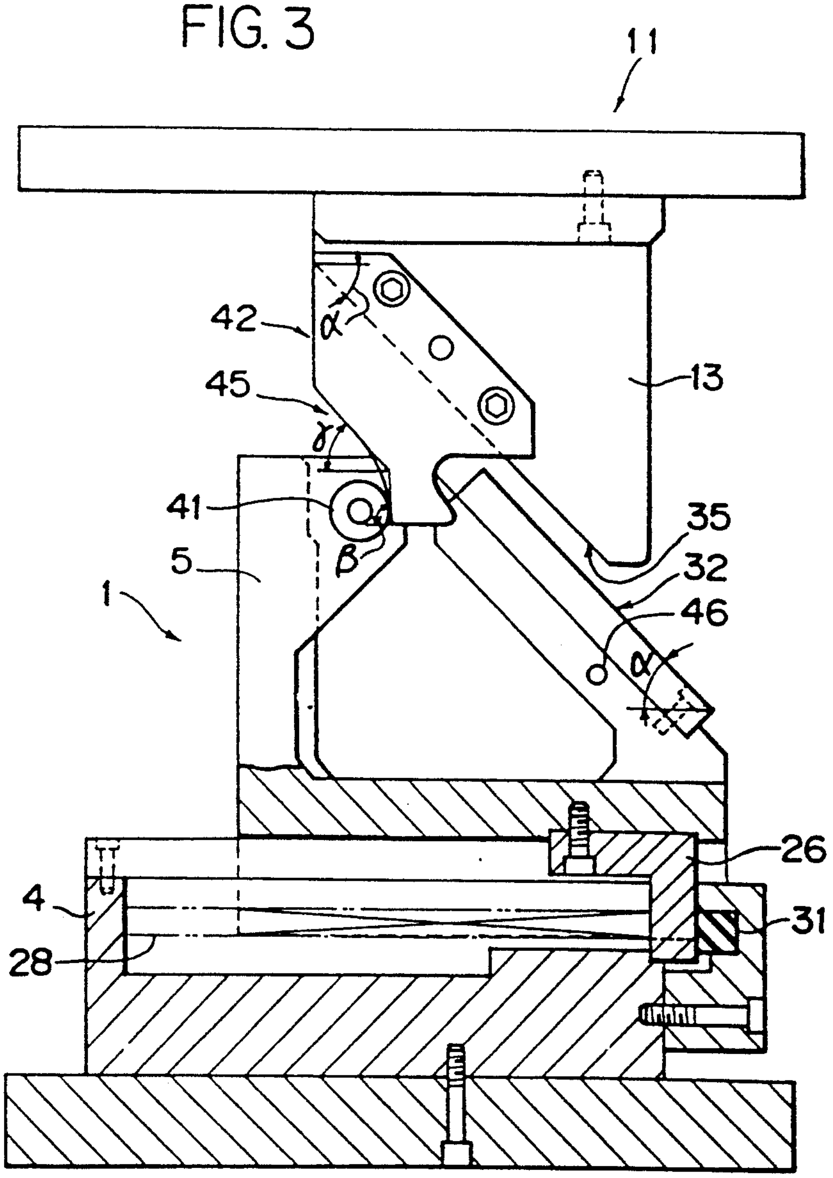
FIG. 3 is a side view showing a state, wherein an upper die descends and a low-speed inclination angle portion of a speed control cam plate installed on an actuating cam starts to contact to a roller disposed on a passive cam.

The upper die 11 descends and as shown in FIG. 3, the low-speed inclination angle $\beta$ portion of the cam face 45 of the speed control cam plate 42 is contacted to the roller 41 of the passive cam 5. Though the passive cam 5 is urged backward by the coil spring 28, since the speed control cam plate 42 has contacted the roller 41, it starts to move forward against this. At this time, the inclined actuating face 35 of the actuating cam 13 and the inclined passive face 32 of the passive cam 5 are still not in contact. Since the low-speed inclination angle $\beta$ is 85° , passive cam 5 starts to move very slowly and noise is hardly generated.

Figure 4:
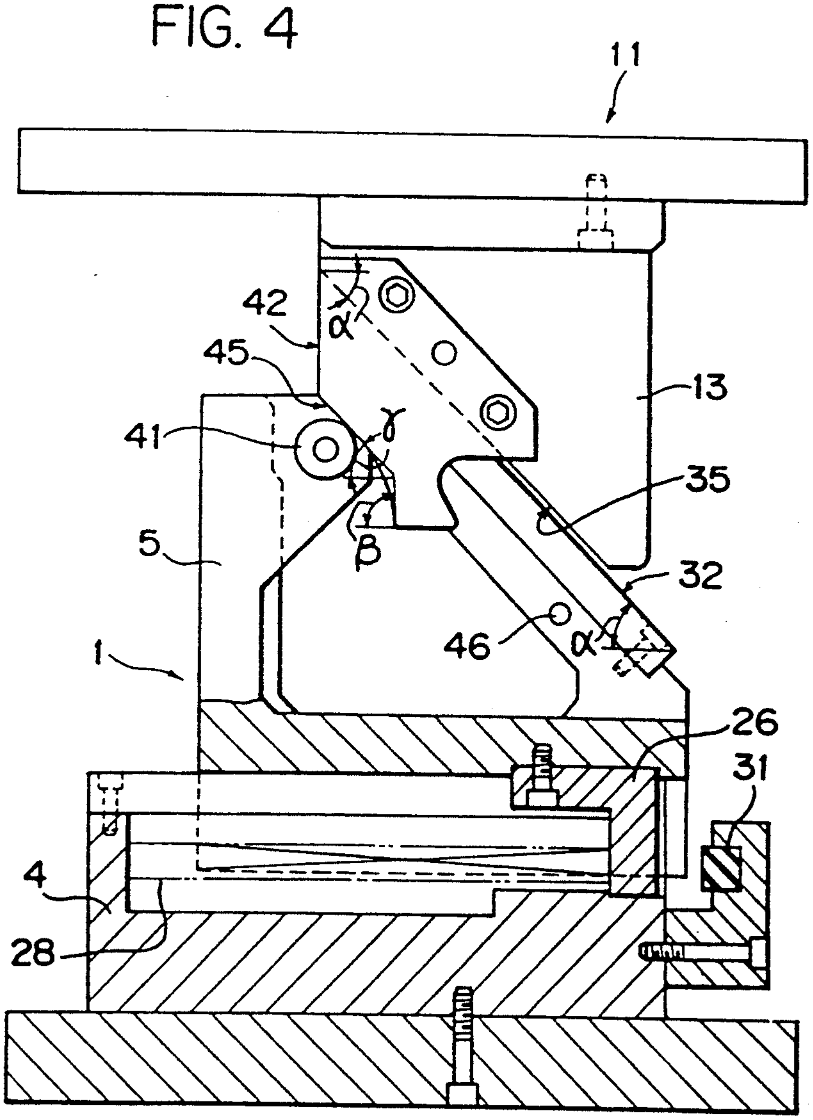
FIG. 4 is a side view showing a state, wherein an upper die descends and a medium-speed inclination angle portion of a speed control cam plate contacts to a roller.

When the upper die 11 descends subsequently, as shown in FIG. 4, the medium-speed inclination angle $\gamma$ portion of the speed control cam plate 42 is contacted to the roller 41, and since the medium-speed inclination angle $\gamma$ is 47°, the speed of the passive cam 5 becomes faster than the case wherein the roller 41 is contacted to the low-speed inclination angle $\beta$. Even when the speed becomes faster, it happens after starting to move slowly so that noise is not generated and the punch 16, cushion rubber 17, stripper plate 18 and so on do not vibrate. Also in this case, the inclined actuating face 35 of the actuating cam 13 and the inclined passive face 32 of the passive cam 13 are still not in contact.

Figure 5:
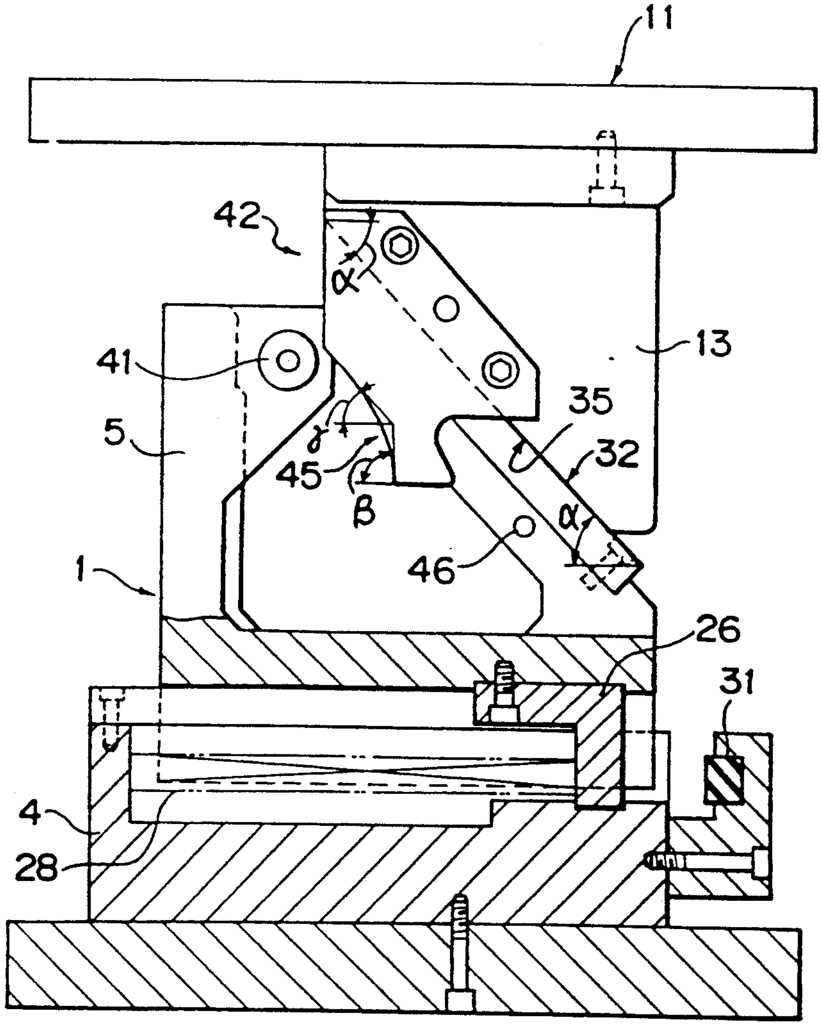
FIG. 5 is a side view showing a state, wherein an upper die descends, an inclined actuating face of an actuating cam contacts to an inclined passive face of a passive cam and a cam face of a speed control cam plate and a roller are detached.

When the upper die 11 descends further subsequently and the contact between the speed control cam plate 42 and the roller 41 is ended, the inclined actuating face 35 of the actuating cam 13 starts to contact to the inclined passive face 32 of the passive cam 5. It moves smoothly to the inclined faces 35, 32 of the actuating cam 13 and the passive cam 5 from the medium-speed inclination angle $\gamma$ portion, so that noise is not generated. FIG. 5 shows a state, wherein the medium-speed inclination angle $\gamma$ portion of the speed control cam plate 42 finishes contact with the roller 41, the inclined actuating face 35 of the actuating cam 13 contacts to the inclined passive face 32 of the passive cam 5, and the cam face 45 of the speed control cam plate 42 detaches from the roller 41.

Figure 6:
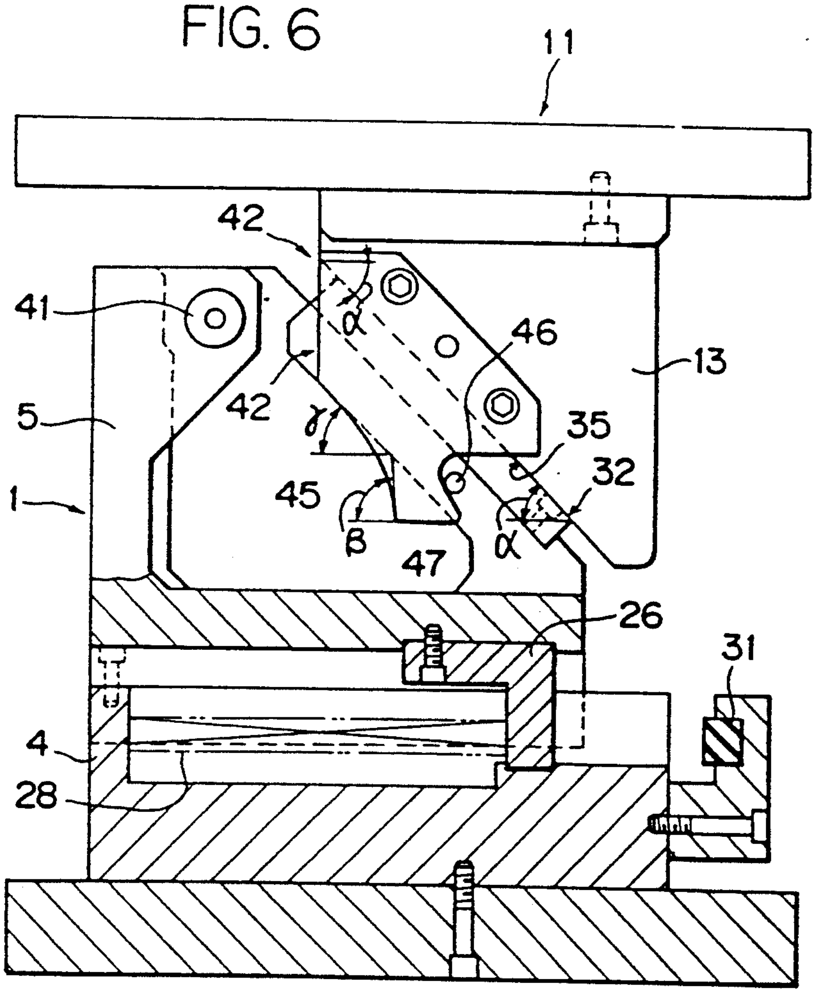
FIG. 6 is a side view showing a state of bottom dead point, wherein an upper die descends further.

FIG. 6 shows a state of bottom dead point where the upper die 11 has descended still further. Though not shown, the punch 16 has finished piercing the work. Naturally, the inclined actuating face 35 of the actuating cam 13 continues to contact to the inclined passive face 32 of the passive cam 5 to generate a pressure force suitable for pressing, and the cam face 45 of the speed control cam plate 42 is not in contact with the roller 41.

As such, in the slide-cam die of the present invention, the speed of the passive cam 5 moves continuously from the low speed to the medium and pressing speeds, so that noise is not generated.

Next, the upper die 11 ascends and operates reversely to the aforesaid operation.

That is, the upper die 11 starts to ascend from the state shown in FIG. 6. In the state of bottom dead point, the safety pin 46 is engaged with a safety cam face 47 which is projected at the lower rear side of the speed control cam plate 42, when the upper die 11 ascends, the safety cam face 47 engages the safety pin 46 and forcibly moves the passive cam 5 away from the work for safety. The safety pin 46 is designed to break when the passive cam 5 does not retreat in this embodiment.

When the upper die 11 ascends to the state shown in FIG. 5, the inclined actuating face 35 of the actuating cam 13 and the inclined passive face 32 of the passive cam 5 are still in contact, and though the cam face 45 of the speed control cam plate 42 urges the passive cam 5 backward by the coil spring 28, it is yet not contacted to the roller 41.

When the upper die 11 ascends subsequently, at the same time as the inclined actuating face 35 of the actuating cam 13 detaches from the inclined passive face 32 of the passive cam 5, the medium-speed inclination angle $\gamma$ portion of the speed control cam plate 42 starts to contact to the roller 41. When the upper die 11 ascends further, as shown in FIG. 4, the actuating cam face 35 of the actuating cam 13 detaches further from the inclines passive face 32 of the passive cam 5. At the same time as the inclined actuating face 35 of the actuating cam 13 detaches from the inclined passive face 32 of the passive cam 5, the medium-speed inclination angle $\gamma$ portion of the cam face 45 of the speed control cam plate 42 contacts to the roller 41, and the speed of the passive cam 5 changes smoothly, so that it causes no noise.

When the upper die 11 ascends further, as shown in FIG. 3, the roller 41 contacts to the low-speed inclination angle $\beta$ portion of the speed control cam plate 42 and the passive cam 5 is decelerated.

When the upper die 11 ascends subsequently, as shown in FIG. 1, the cam face 45 of the speed control cam plate 42 is detached from the roller 41, and though the spring shoe 26 of the passive cam 5 is contacted to the cushion rubber 31, since the passive cam 5 has been decelerated by the speed control cam plate 42, impact noise is never generated.

In the slide-cam die, the speed of the passive cam 5 gradually slows down even at ascending.

In the above-mentioned embodiment, though the cam face of the speed control cam plate consisting of the low-speed inclination angle and the medium-speed inclination angle has been described, the present invention is not limited thereto, it may be formed into a cam face of a multi-stage inclination angle or a circular cam face as required.

In the above-mentioned embodiment, though an example in which the roller is disposed on the passive cam and the speed control cam plate is disposed on the actuating cam has been described, the speed control cam plate may be disposed on the passive cam and the roller may be disposed on the actuating cam.

The present invention is, as described above, directed to a noise reducing structure of the slide-cam die, wherein in the slide-cam die comprising, a passive cam having an inclined passive face of a fixed inclination angle $\alpha$, and an actuating cam having an inclined actuating face of the same inclination angle $\alpha$ as that of the inclined passive face of the passive cam, and contacting the inclined actuating face of the actuating cam to the inclined passive face of the passive cam to drive the passive cam for pressing a work; a roller is disposed rotatably at the side of the passive cam, and a speed control cam plate having, at a location of the actuating cam facing the roller, a cam face having, at a position where an upper die contacts to the roller at the beginning of descending, a low-speed inclination angle $\beta$ which is larger than the inclination angle $\alpha$ of the inclined faces of the passive cam and the actuating cam and close to a right angle, and a succeeding medium-speed inclination angle $\gamma$ which is slightly larger than the inclination angle $\alpha$ of the inclined faces of the passive cam and the actuating cam, is disposed such that, after the medium-speed inclination angle $\gamma$ of the cam plate has contacted to the roller, the inclined actuating face of the actuating cam contacts to the inclined passive face of the passive cam for pressing work, whereby instantaneous contact between the inclined passive face of the passive cam and the inclined actuating face of the actuating cam is avoided, the passive cam is moved slowly at the beginning to reach the suitable descending speed and also moved slowly at the end to reduce noise, and further, vibration of processing members such as a punch is lessened as much as possible to reduce noise to about 10% of the conventional noise.

What is claimed is:

1. A noise reducing die assembly comprising:
   - a passive cam having an inclined passive face of a fixed inclination angle $\alpha$,
   - an actuating cam having an inclined actuating face of the same inclination angle $\alpha$ as that of the inclined passive face of the passive cam,
   - means for moving said actuating cam so that said inclined actuating face of the actuating cam engages with the inclined passive face of the passive cam to drive the cam for pressing a workpiece,
   - a roller rotatably mounted at a side of said passive cam,
   - a speed control cam plate located on said actuating cam, facing said roller, and positioned to engage said roller upon moving of said actuating cam and before said inclined actuating face engages said inclined passive face,
   - said speed control cam plate having a cam face with a first inclination portion which engages said roller first and a second inclination portion which engages said roller thereafter,
   - said first inclination portion being at a low-speed inclination angle $\beta$ which is larger than the inclination of angle $\alpha$ of the inclined faces of the passive cam and the actuating cam,
   - said second inclination portion being at a succeeding medium-speed inclination angle r which is larger than the inclination angle $\alpha$ of the inclined faces of the passive cam and the actuating cam, but is less than the low-speed inclination angle $\beta$, and whereby upon actuation of said moving means, said inclined actuating face of the actuating cam contacts the inclined passive face of said passive cam for pressing a workpiece after said second inclination portion having the medium-speed inclination angle $\alpha$ has contacted said roller.

2. A noise reducing structure as recited in claim 1, wherein said low-speed inclination angle $\beta$ is 85° and said medium-speed inclination angle $\gamma$ is 47°.

3. A noise reducing structure as recited in claim 1, wherein a safety pin is located on said passive cam and a safety cam face is carried on said actuating cam.

4. A noise reducing structure as recited in claim 3, wherein said safety cam face is located on said speed control cam plate.

* * * * *